Figure 11:
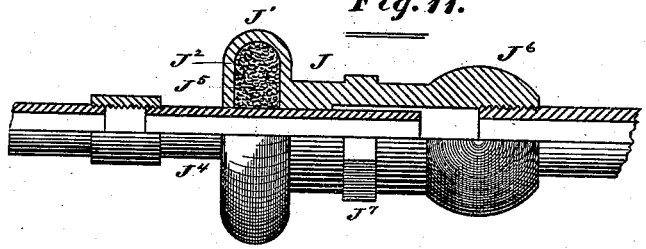

(No Model.)　　　　　　E. F. OSBORNE.　　　11 Sheets—Sheet 1.
Heating Apparatus.
No. 236,247.　　　　　　　　Patented Jan. 4, 1881.
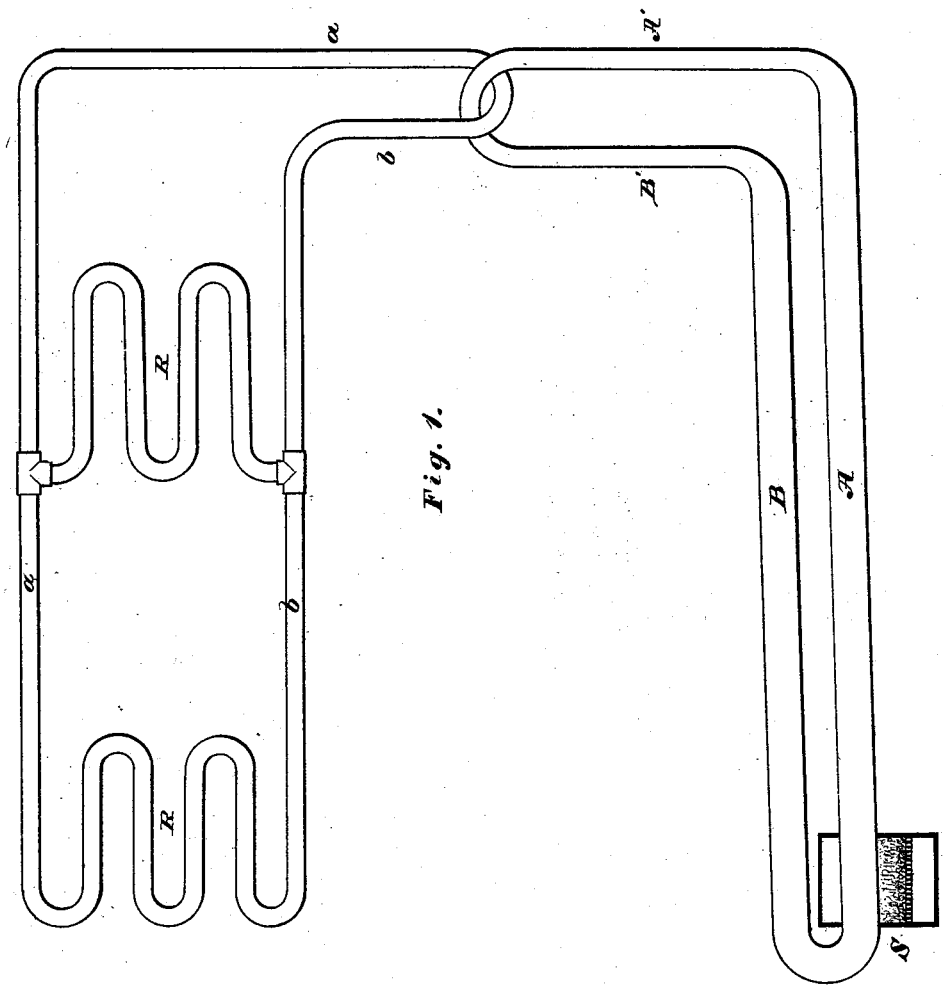
WITNESSES
W. S. Baker.
W. C. Adams.
INVENTOR
Eugene F. Osborne
per M. E. Dayton
Attorney

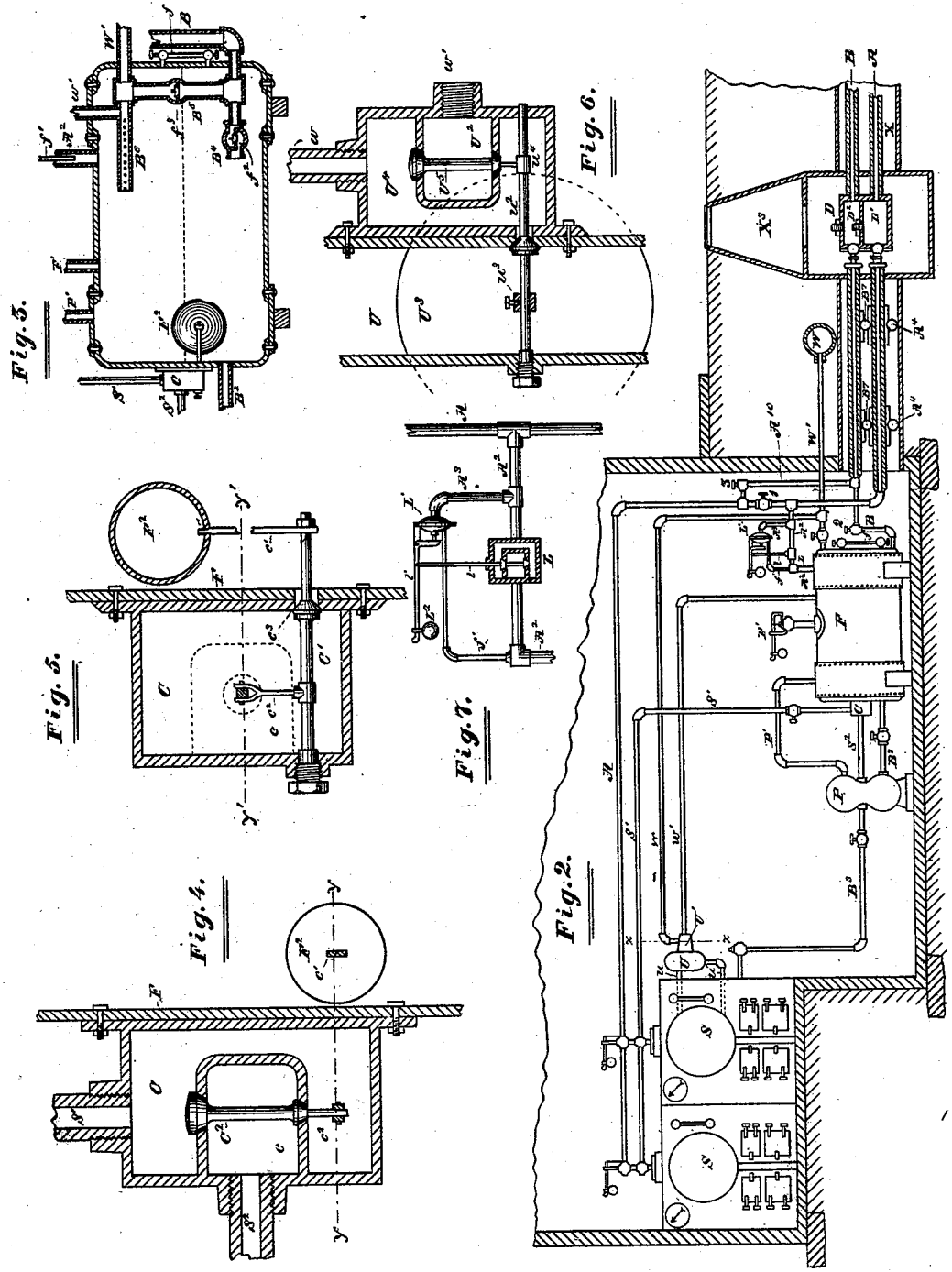

(No Model.) 11 Sheets—Sheet 3.
E. F. OSBORNE.
Heating Apparatus.
No. 236,247. Patented Jan. 4, 1881.
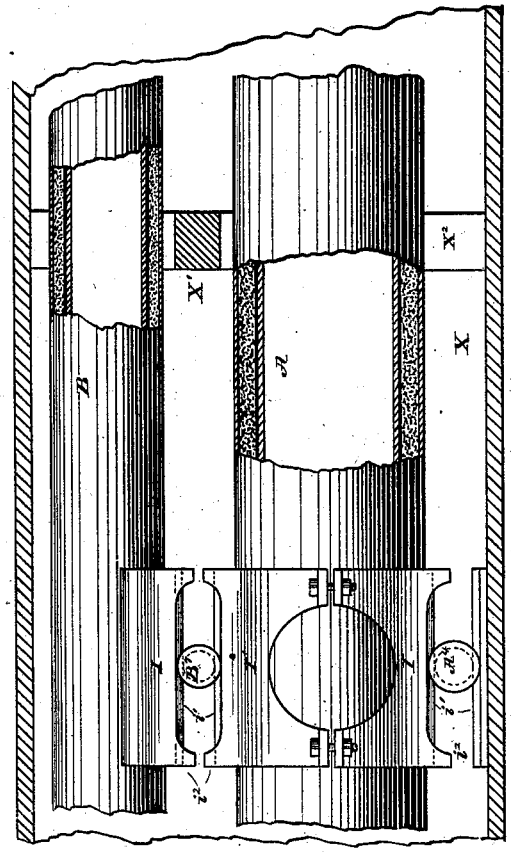
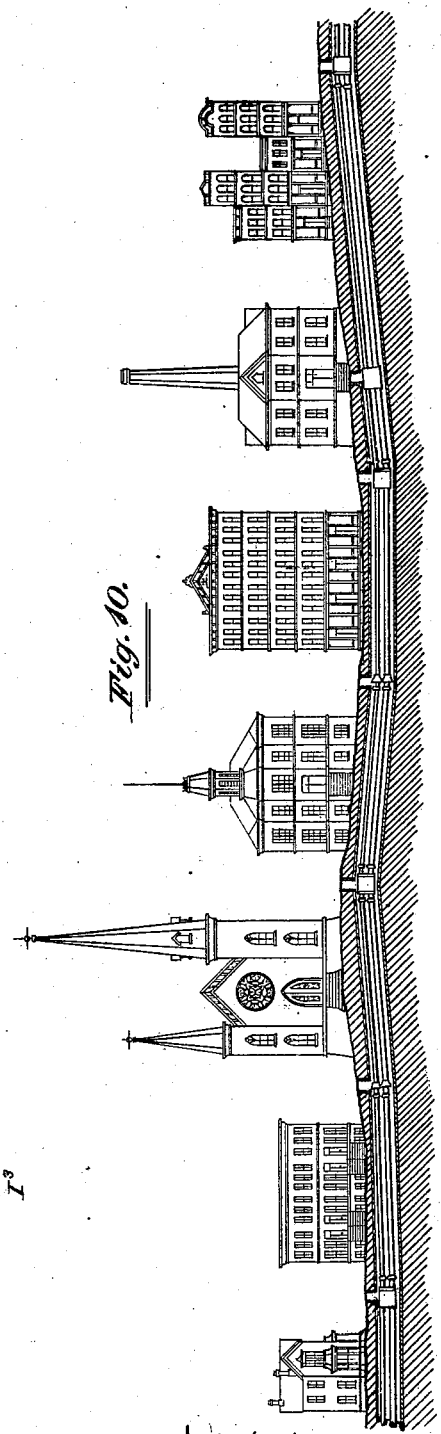
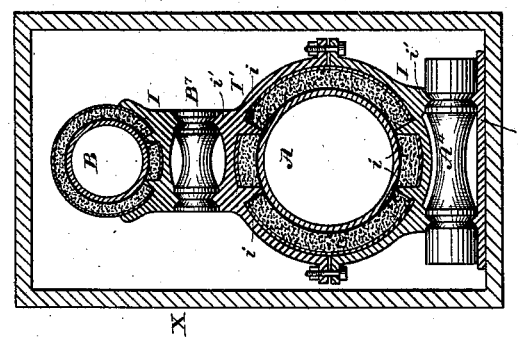
Witnesses
W. L. Baker
W. C. Adams.
Inventor
Eugene F. Osborne
per M. E. Dayton
Attorney (No Model.)

11 Sheets—Sheet 4.

E. F. OSBORNE.
Heating Apparatus.

No. 236,247. Patented Jan. 4, 1881.

Witnesses:
W. S. Baker,
W. C. Adams.

Inventor:
Eugene F. Osborne
per M. E. Dayton
Attorney

N. PETERS, PHOTO-LITHOGRAPHER, WASHINGTON, D. C.

(No Model.)   E. F. OSBORNE.   11 Sheets—Sheet 5.
Heating Apparatus.
No. 236,247.   Patented Jan. 4, 1881.
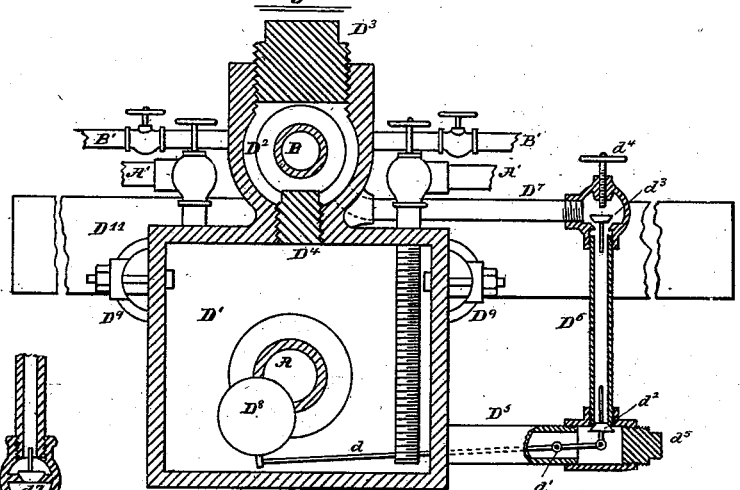
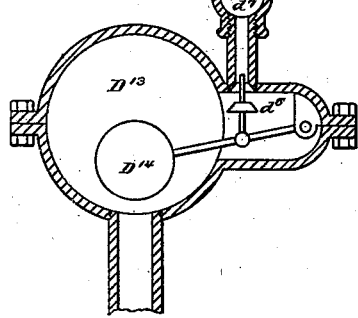
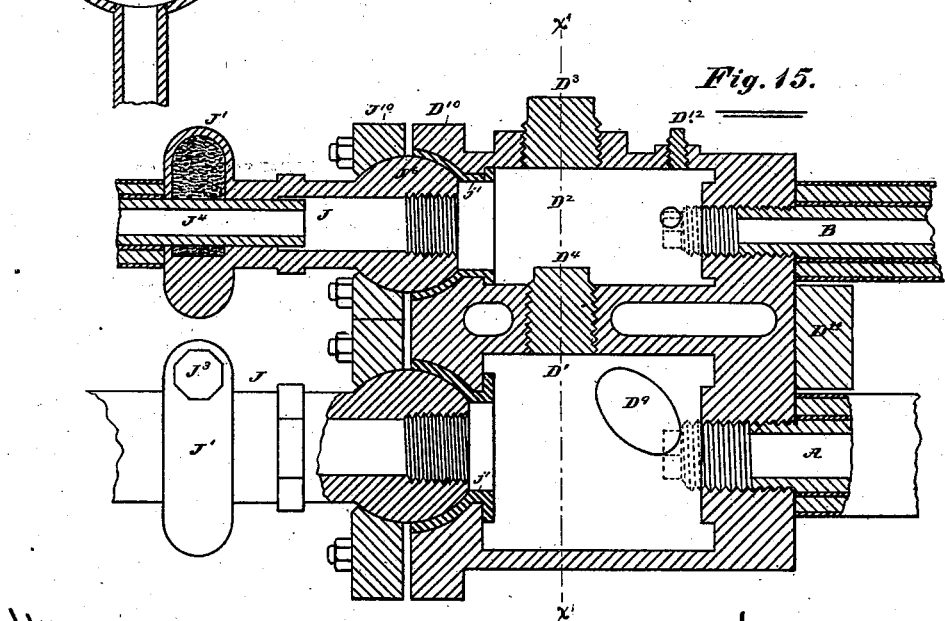

(No Model.)

11 Sheets—Sheet 6.

E. F. OSBORNE.
Heating Apparatus.

No. 236,247. Patented Jan. 4, 1881.

Witnesses—
W. S. Baker.
W. C. Adams

Inventor—
Eugene F. Osborne
per M. E. Dayton
Attorney (No Model.) 11 Sheets—Sheet 7.

E. F. OSBORNE.
Heating Apparatus.

No. 236,247. Patented Jan. 4, 1881.

Witnesses
H. L. Baker
W. C. Adams.

Inventor
Eugene F. Osborne
per M. E. Dayton
Attorney (No Model.)　　　　　　　E. F. OSBORNE.　　　　11 Sheets—Sheet 8.
Heating Apparatus.
No. 236,247.　　　　　　　　　Patented Jan. 4, 1881.
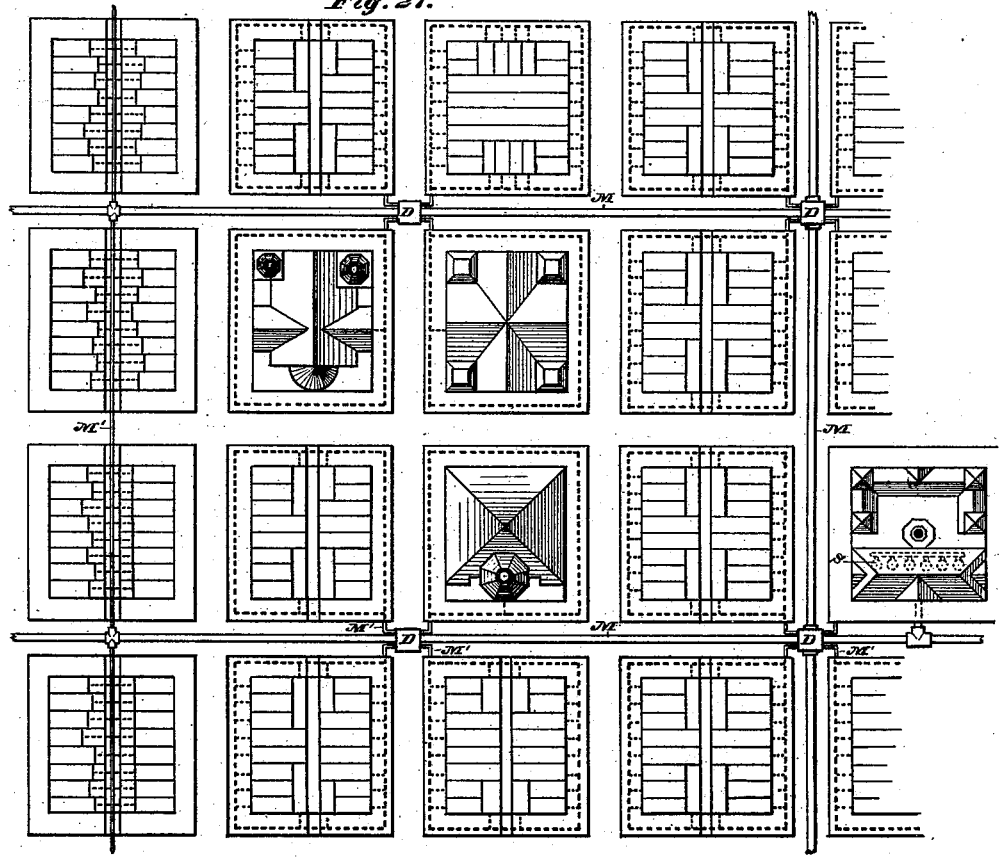
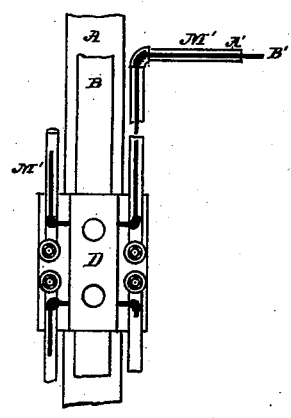
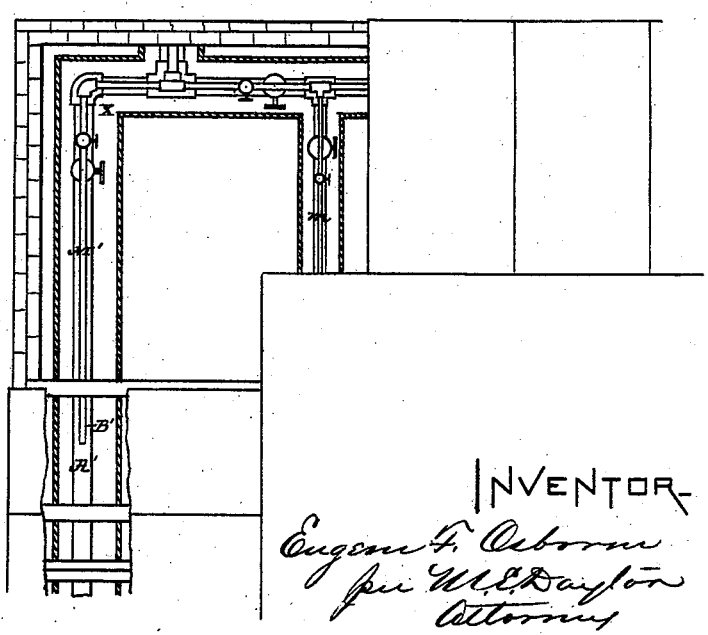

(No Model.) 11 Sheets—Sheet 9.

E. F. OSBORNE.
Heating Apparatus.

No. 236,247. Patented Jan. 4, 1881.

WITNESSES  
W. L. Baker.  
W. C. Adams.

INVENTOR  
Eugene F. Osborne  
per M. E. Dayton  
Attorney.

(No Model.) 11 Sheets—Sheet 10.

E. F. OSBORNE.
Heating Apparatus.

No. 236,247. Patented Jan. 4, 1881.

Witnesses—
W. L. Baker.
W. O. Adams.

Inventor—
Eugene F. Osborne
per M. E. Dayton
Attorney (No Model.) 11 Sheets—Sheet 11.
E. F. OSBORNE.
Heating Apparatus.
No. 236,247. Patented Jan. 4, 1881.
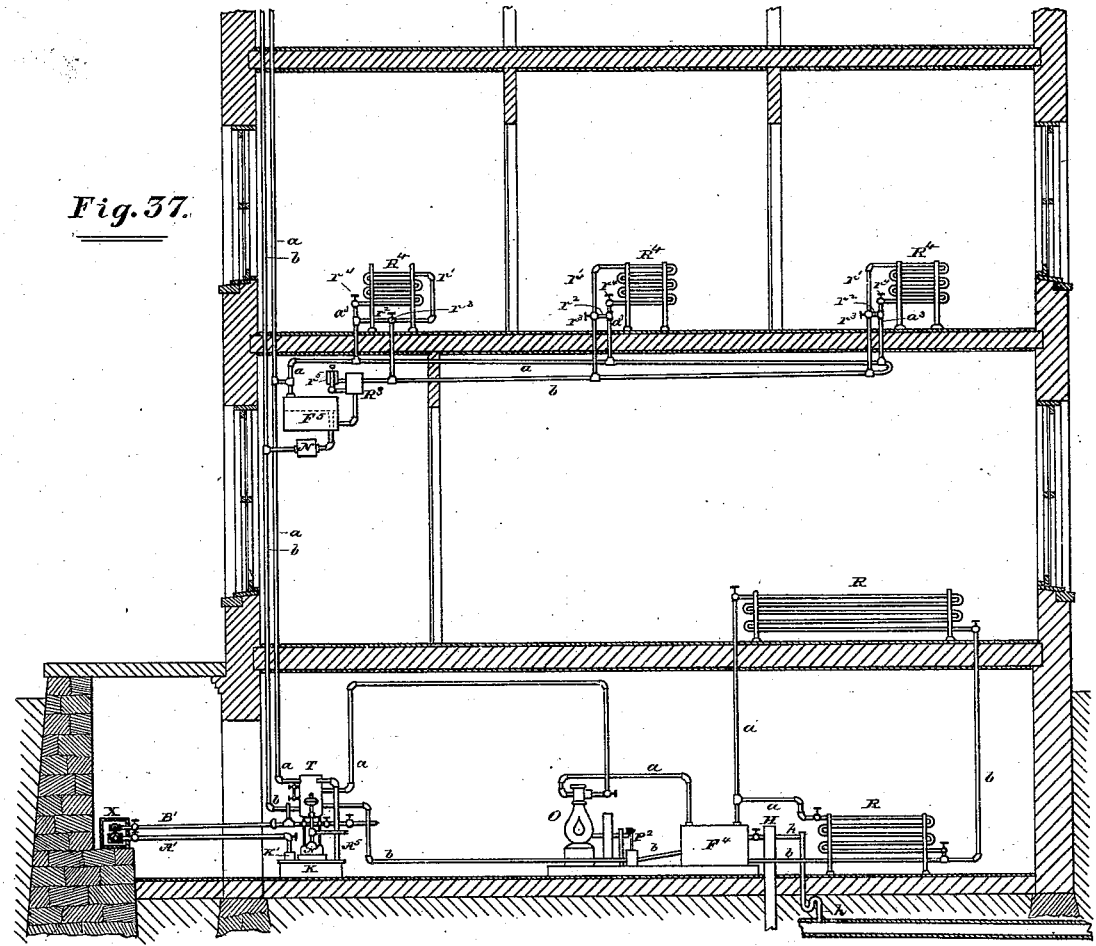
*Fig. 37.*
*Fig. 38.*
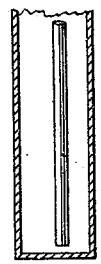
Witnesses
W. L. Baker
W. C. Adams
Inventor
Eugene F. Osborne
per M. E. Dayton
Attorney

UNITED STATES PATENT OFFICE.

EUGENE F. OSBORNE, OF ST. PAUL, ASSIGNOR OF ONE-HALF TO HERBERT M. CARPENTER, OF MINNEAPOLIS, MINNESOTA.

HEATING APPARATUS.

SPECIFICATION forming part of Letters Patent No. 236,247, dated January 4, 1881.

Application filed August 23, 1880. (No model.)

*To all whom it may concern:*

Be it known that I, EUGENE F. OSBORNE, of St. Paul, in the county of Ramsey and State of Minnesota, have invented certain new and useful Improvements in Steam-Heating Plants and Apparatus; and I do hereby declare that the following is a full, clear, and exact description thereof, reference being had to the accompanying drawings, and to the letters of reference marked thereon, which form a part of this specification.

In apparatus and systems heretofore employed for furnishing heat to several buildings through the medium of steam derived from a common source of supply numerous serious faults are observable. Among these may be mentioned, first, the want of accuracy in methods and means employed to determine the amount of heat supplied to the individual buildings or consumers. Failure in this essential respect has arisen, generally, from the mistaken effort made to measure the steam itself, which, owing to its varying attenuation, pressure, and hydrous conditions, is utterly impracticable within the limits of cost and space imposed by the nature of the case. Whenever the attempt has been made to measure the waters of condensation equally serious error has arisen from the failure, on the one hand, to limit the measurement to the water condensed within the building, or, on the other hand, to include in the measurement a body of water which, by its volume and temperature, represents or forms a basis for determining the amount of heat supplied. A second objection, common to methods of general steam-heat supply hitherto adopted, is that of water-wastage, by reason of which the cost of boiler-plant is greatly enhanced and the expense of fuel is made disproportionately large. Where the water to be used is hard such wastage additionally increases very largely the cost of running and outlay for repairs, in consequence of constant accretions of lime and other impurities in the boilers and pipes. In many localities the question of water-waste alone may therefore become vital to success, while in all cases alike it is of the highest import as bearing on economy in working. Other equally serious practical objections present in existing modes of general steam-heating might be cited, all of which, with those mentioned, are attributable to what I believe to be a fundamental error common to all such systems—I mean the error of attempting to supply steam, instead of the heat of steam, from the general to the local systems of distribution. I have therefore devised a method and apparatus in which this radical error is avoided, and I am able thereby not only to obviate the faults specified, but to secure many advantages in other respects. I have particularly sought to attain therein cheapness in original construction, simplicity, effectiveness, economy, and reliability in operation, and practical accuracy in apportionment of charges for heat supplied.

My invention consists in the several novel features of construction and operation hereinafter fully set forth, and pointed out in the claims.

Figure 12:
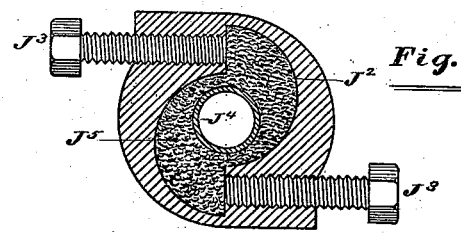
Figure 13:
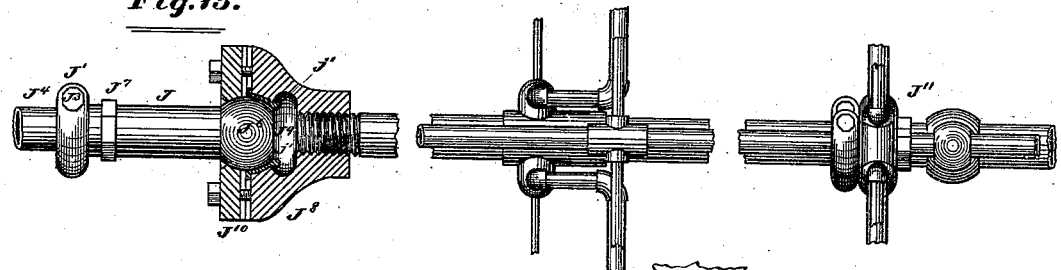
Figure 14:
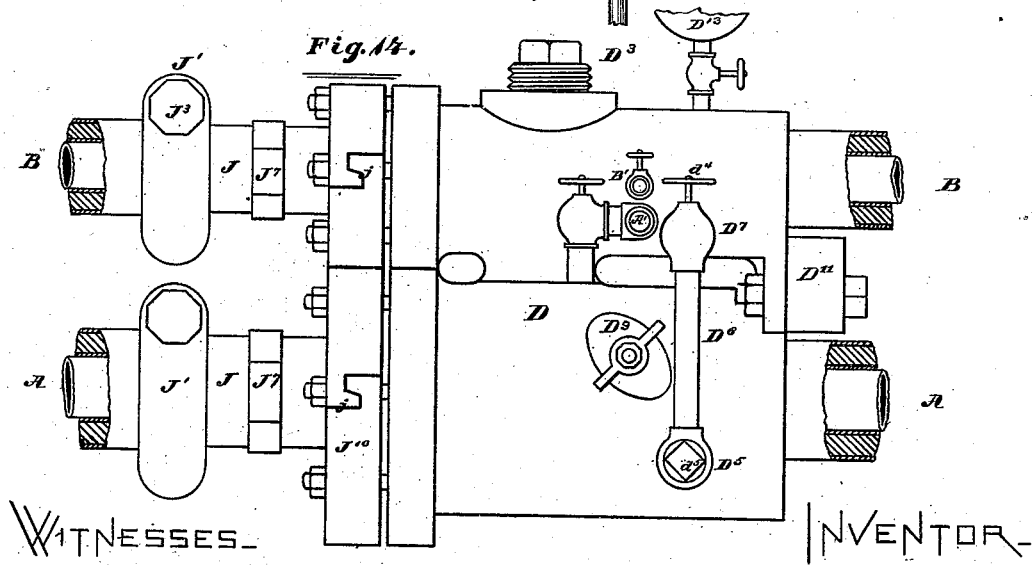
Figure 20:
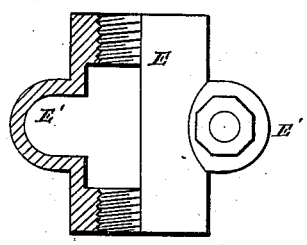
Figure 21:
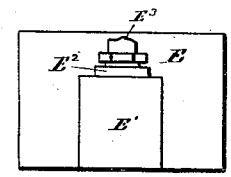
Figure 22:
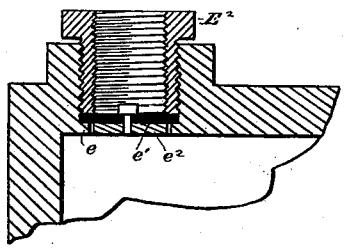
Figure 23:
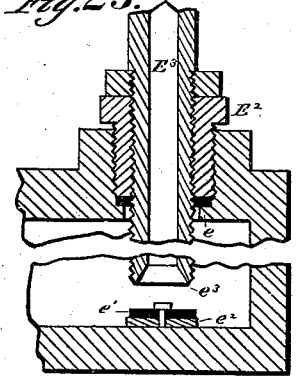
Figure 19:
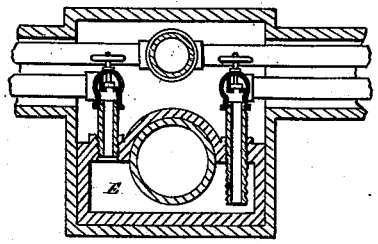
Figure 18:
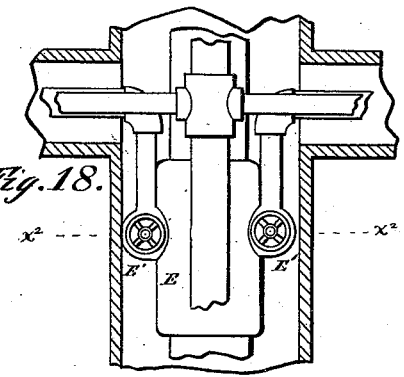
Figure 24:
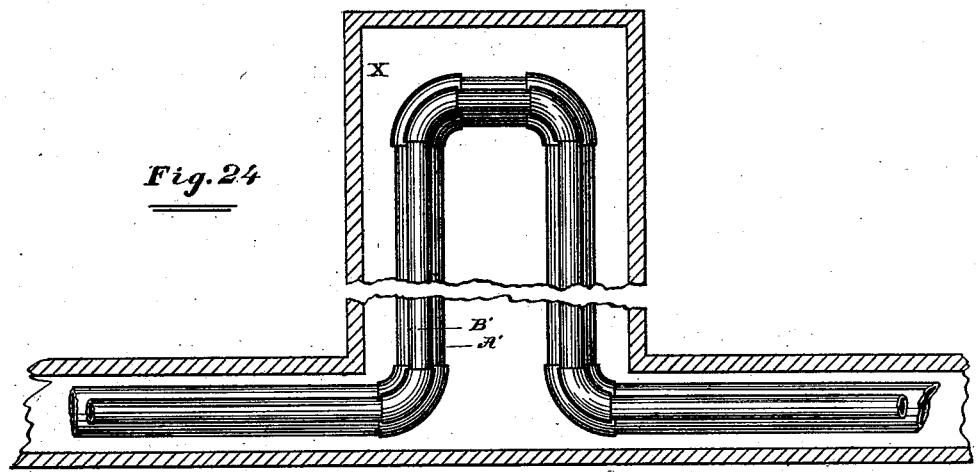
Figure 25:
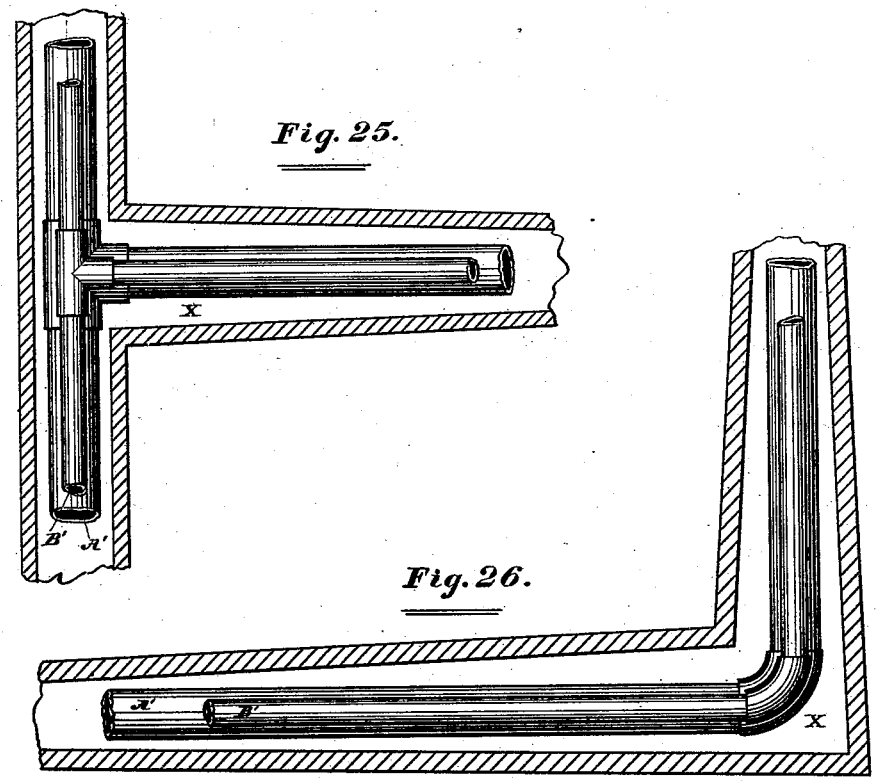
Figure 26:
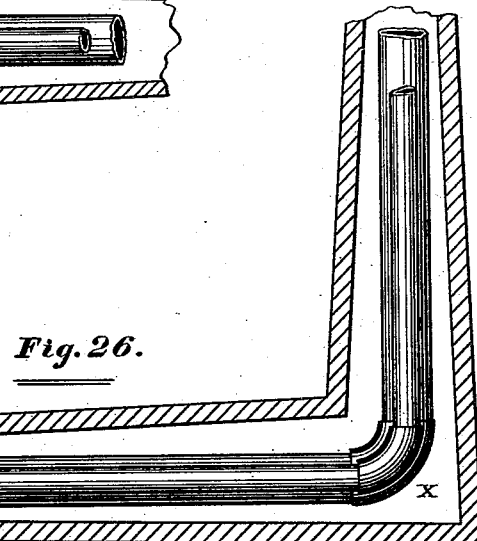
Figure 30:
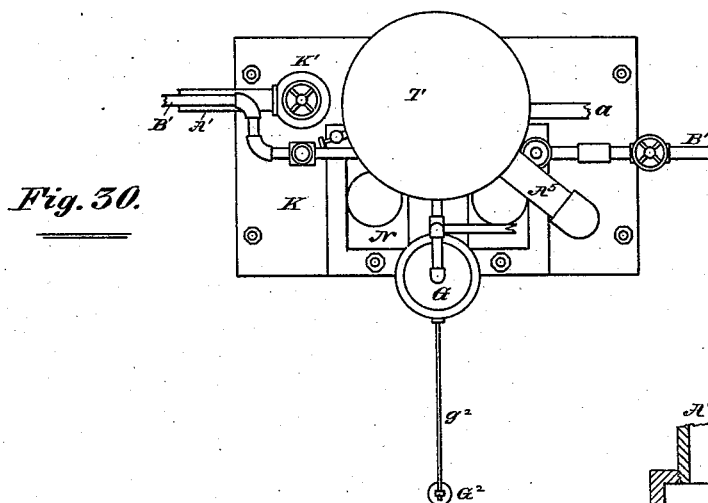
Figure 33:
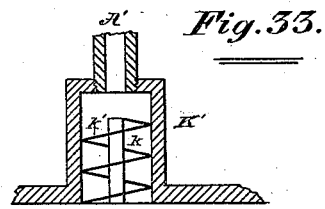
Figure 31:
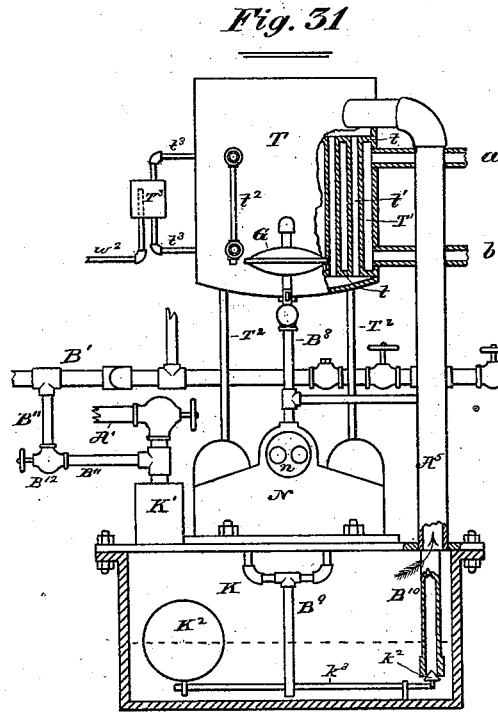
Figure 32:
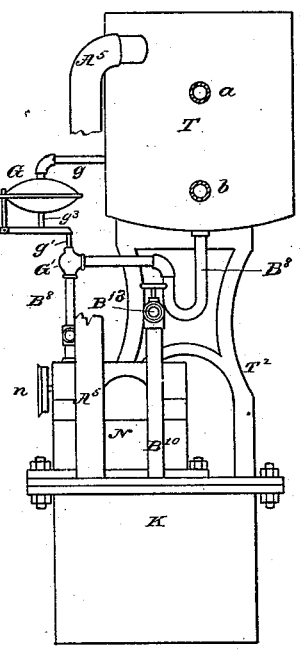
Figure 36:
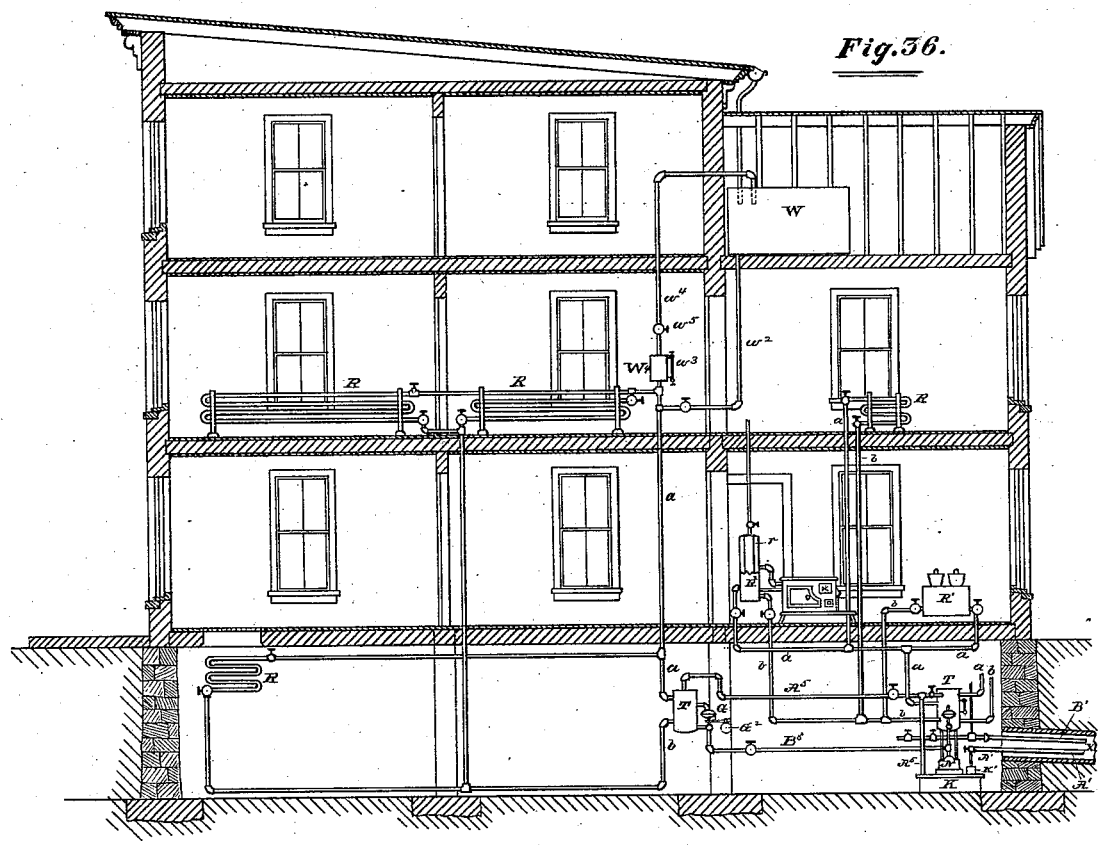
Figures 35, 54:
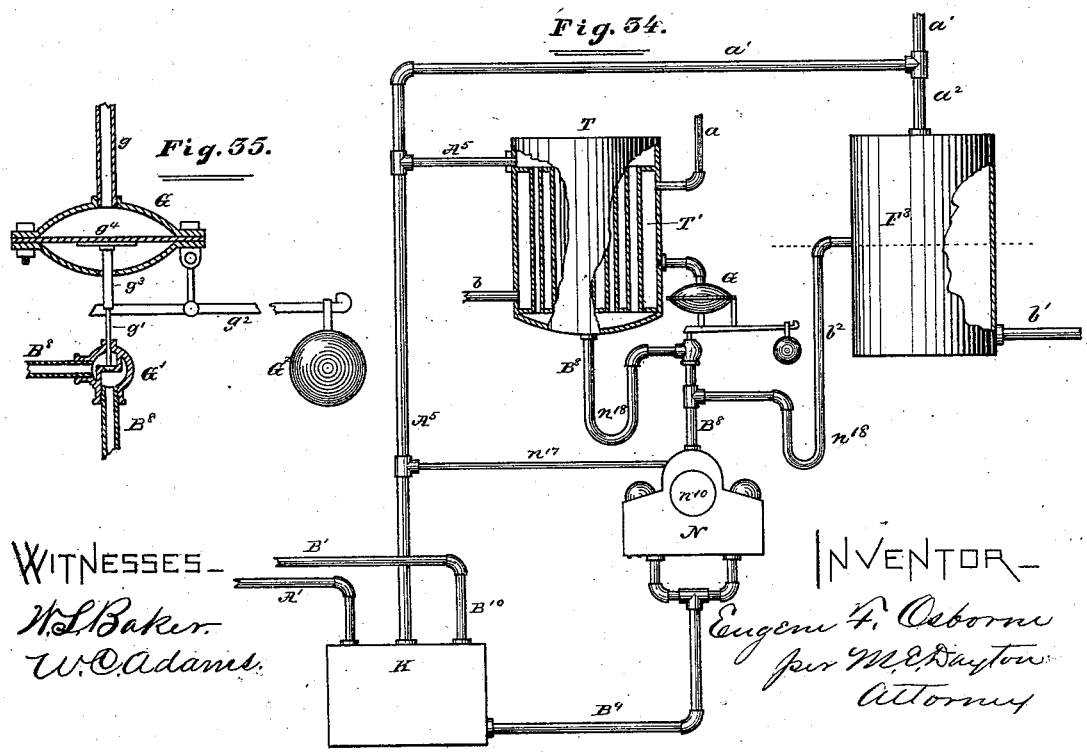

In the accompanying drawings, Figure 1 represents the central idea of my invention by a simple fanciful delineation of two totally distinct but interacting circuits, one connected with the steam-generator, and conducted through the streets, and the other located in a building to be heated. The former is herein denominated the "main circuit" and the latter the "local circuit." Fig. 2 is an elevation of the apparatus located at the generating station, together with a vertical section of a portion of the main-circuit pipes. Fig. 3 is a vertical section of the tank F, (shown in Fig. 2,) revealing certain features of interior construction having reference to some of the tank-connections. Fig. 4 is a central vertical section of the chamber C of Fig. 2 through the line $y'\ y'$ of Fig. 5. Fig. 5 is a horizontal section of said chamber through the line $y\ y$ of Fig. 4. Fig. 6 is a transverse section of the projecting portion U' of an automatic water-supply regulator connecting the street-main or other source of water-supply with the generators and main circuit. Fig. 7 is an enlarged representation of an apparatus shown in Fig. 2 as connecting the tank F with the main-circuit supply-pipe for the purpose of maintaining a substantially constant minimum difference of pressure between the supply and return pipes of the main circuit. Fig. 8 is a vertical transverse section of the pipes of the main circuit arranged as proposed and incased in a box beneath the street-surface. Fig. 9 is a side elevation of the mains and other parts shown in Fig. 8. Fig. 10 is a vertical section of an uneven street, showing the direction of the pipes laid therein. Fig. 11 is a side view, partly elevation and partly section, of a fitting or casting, and parts connected therewith, to form a "slip" or "expansion" joint in a pipe-line. Fig. 12 is a transverse section of the packing-bulb of the fitting shown in Fig. 11. Fig. 13 shows the fitting J of Fig. 11 applied to form a flexion-joint, and also (at the right) a modification thereof to give connection to branch pipes. Fig. 14 is a side elevation of a duplex-main coupling of peculiar construction, which forms at once a connection for adjacent pipes in both supply and return mains of the main circuit, a rigid connection between the supply and return mains, and a means of interiorly connecting the two mains at will, besides serving other offices, in connection with elevated and depressed points in the main lines, as will be explained. Fig. 15 is a central longitudinal vertical section of the coupling just mentioned. Fig. 16 is a transverse section of said coupling through the line $x'$ $x'$ of Fig. 15. Fig. 17 is an enlarged central section of an air-valve to be sometimes used on the duplex main coupling just mentioned and shown in place in Fig. 14. Fig. 18 is a plan of a minor branch coupling of novel construction, adapted for a single one of the mains, or a principal branch thereof, being more especially intended for, and here shown in, the supply-main. Fig. 19 is a vertical transverse section through the line $x^2$ $x^2$ of Fig. 18. Fig. 20 is a plan, partly in horizontal section, of the coupling of the last two figures detached, showing the interior side wings thereof. Fig. 21 is a side elevation of the same coupling. Figs. 22 and 23 are detail views of the same coupling, showing devices for tapping the same under pressure for branch service. Figs. 24, 25, and 26 show familiar modes of incasing underground service-pipes and leaders to provide for expansion and contraction therein. Fig. 27 shows, in plan, a business-section and also a residence-section of buildings and the main-pipe lines and branches leading thereto, as herein proposed. Fig. 28 is an enlarged view of the coupling intended for the intersection of streets and of branches leading therefrom to the four adjacent squares of business-buildings. Fig. 29 illustrates my proposed method of supplying an entire business-square from a single connection with the main circuit. Fig. 30 is a top view. Fig. 31 is a front elevation, and Fig. 32 is a side elevation, of the apparatus by which the main and local circuits of my system co-operate, or, in a sense, connect, by which the water of condensation from the street-mains is separated before measurement, by which the heating force given off to the local circuit is regulated automatically and varied at will, and by which the water of condensation produced by transmission of heat from the main to the local circuit is measured, portions of the apparatus being shown in partial section. Fig. 33 is a vertical section of the anhydrator K', (seen in Fig. 31.) Fig. 34 is an elevation of the elements of Figs. 30, 31, and 32, somewhat differently arranged and modified to provide for two limited local circuits, one of which is for steam directly supplied from the main circuit. Fig. 35 is an enlarged view, in section, of the diaphragm pressure-regulator shown in Figs. 30, 31, 32, 34, 36, and 37. Fig. 36 shows the interior of a residence-building having two limited local circuits, one heating the rear portion by steam and the other heating the front portion by hot water. Fig. 37 shows the interior of a business-building provided with an engine, a limited local circuit, in connection with the engine-exhaust, and a limited circuit for a group of offices, having an individual meter, and novel appliances for discharging the air from the several radiators in this circuit at a common point. Fig. 38 is an enlarged detail view of parts shown in Fig. 37.

For the purpose of imparting, at the outset of this description, a clear general idea of the distinctive feature of my invention, I present the fanciful Fig. No. 1, in which A and B represent two mains connecting with each other at one extremity through a steam-generator, and at the other through the service-connections A' and B'. A is the steam-supply main. B is the water-return main. A' is the service-supply pipe, and B' is the service-return. The mains, with the service-pipes, constitute a closed circuit, continually circulating steam from the generator S outward to the extremity of the circuit, and the water of condensation from this point back to the generator. As a whole, this system is herein designated the "main circuit." Similarly, $a$ and $b$ represent a closed circuit located in the building to which heat is supplied, and having connection to form a circuit through the radiators R, or other appliances for heating, cooking, &c., or through connection with each other outside of or beyond such appliances. This system of pipes $a$ and $b$, with their communications with each other, is herein called a "local circuit." The two circuits, main and local, are shown in said Fig. 1 as being interlinked, but as not having interior connection. By this I would make plain that the fluid of one circuit does not mingle with that of the other; or, in other words, that the two circulations are entirely separate and distinct. By means of devices to be hereinafter described, which devices are located at the junction of the two circuits, the heat of the steam supplied by the main circuit is transmitted to the contents of the local circuit. The principle of heat-supply in this system is, therefore, that of transmission and not of transfusion. In other words, I supply heat and not steam.

The apparatus through the medium of which heat is transmitted from the one to the other is called a "transmitter." It may, for example, correspond with the tubular boiler of an ordinary house steam-heating apparatus. Instead of passing flame and heated gases from a furnace-fire through the boiler-tubes to make steam for the local distribution, steam is passed through the tubes for precisely the same purpose.

By means of a closed circuit embracing the pipes A A' B' B and the generator S, the same water (which is the vehicle of heat) is continually heated over and over and circulated throughout the main system. Being inaccessible to patrons, such water is or may be maintained at a constant and identical quantity, except so far as it unavoidably escapes by leakage, which is supplied. It thus becomes free from such impurities as injure the boilers and pipes, thereby greatly reducing the cost of repairs and the expense of running, as well as diminishing the original outlay for boiler-plant. By reason, moreover, of having a closed circuit distinct from the local distribution, it becomes entirely practicable to accurately determine the amount of heat supplied to the individual consumer, as will be fully explained by reference to devices designed for the purpose.

Having thus given a compendious description of the distinctive feature of my system, I proceed to explain, first, the boiler-house plant, which embraces the generators and other apparatus located at the generating-station, and necessarily beneath the eye and control of the engineer in charge; second, the general distributing-plant, embracing the main and service pipes from the boiler-house to the building to be supplied; third, the transmitting and metering plant; and, fourth, various details and modifications of interior apparatus suited to a variety of situations and to some special purpose.

In Fig. 2 is shown a room containing steam-generators, a tank, a pump, and the supply and return mains leading from the room beneath an adjacent street. The said appliances are all in the main circuit.

S S are steam generators or boilers of any approved constructions. A is a steam-pipe or "supply-main" leading from the boilers S and out of the building, about four feet beneath the surface of the street. B is a water-pipe or "return-main," having connection with the supply-main at its outer extremity, and entering the building immediately over the supply-main, as shown. Both mains are incased in the same box X. Said pipe B enters the tank F near its bottom, as indicated in Fig. 2, and has continuation, through the medium of the tank and the pipe $B^2$, to the pump P, and thence, through $B^3$, to the generators S. The pump P serves to force the water of the tank F (that is, of the return-main B) to the boiler S, and thus maintain the circulation through the main circuit. The pump-water feed $B^2$ is above the entrance of pipe B and below the proposed water-line of the tank F.

The pump P is made automatic in its operation, as follows: S' and $S^2$ is the steam-supply from the boilers S to the pump. Said supply is provided with a valve-chest, C, within which is a double puppet-valve operated by a float within the tank F, to which the valve-chest is attached. The details of construction and mode of operation are shown in Figs. 3, 4, and 5. Fig. 4 being a vertical section in the plane of the pipes S' $S^2$ or y' y' of Fig. 5, and Fig. 5 being a horizontal section through y y of Fig. 4. C' is a horizontal shaft near the bottom and at one side of the valve-chest C, passing through said chest and into the tank F, and closing the passage between the two by the ground joint $c^3$. Within the tank said shaft has a lateral arm, c', to the extremity of which is attached the float $F^2$, which float rides the water of said tank and oscillates the shaft C'. Within the chest C said shaft has a second lateral arm, $c^2$, pivoted to the rod of the double puppet-valve $C^2$, seated in the upper and lower walls of the interior valve-chamber, c, as seen in Fig. 4. The steam-supply S' enters the outer chamber, C, and the pipe $S^2$ leads from the inner chamber, c. When the water in the tank F rises above its proper level (indicated by a dotted line in Fig. 3) the valve $C^2$ is raised by the float $F^2$, and the steam, always on full head in the outer chamber, C, is let onto the pump. The speed of the pump is thus constantly regulated by the water of the tank F, and operates to maintain the same at a constant level.

The exhaust P' of the pump P is shown as leading to the tank F. Within the tank F the pipe B has a horizontal extension, $B^4$, below the water-line, closed, however, as an outlet, by a check-valve, $f^2$. The discharge of the return-main B is through the vertical extension $B^5$ and horizontal extension $B^6$ at the upper part of the tank, $B^5$ being provided with a check-valve, $f^3$, opening upward. By means of these valves, arranged as described in the pipes $B^4$ and $B^5$, if steam should be liberated and then suddenly condensed at any point in the return-main B, the water of the tank will flow back into the said main through the valve $f^2$. The extension $B^6$ is perforated, or otherwise fitted to discharge in a spray to condense the steam from the exhaust P', if admitted, or the steam from pipe $A^2$, which will be further mentioned.

W is a water-main or other general source of water-supply, drawn upon from time to time, as required, to replenish the small but inevitable wastage from leakage in the main circuit or from loss in the boiler and tank room. It is connected with the interior of the tank through the spray-pipe $B^6$, as clearly shown in Fig. 3. Automatic supply of water from the main W is provided for by the regulator U U', connected with the boilers, and with the pipe W' and tank F, as will now be described by reference to Figs. 2 and 6.

U is a float-chamber, communicating with the boiler S by means of the pipes $u\,u'$, respectively above and below the range of water-line in said boilers. U' is a wing of the chamber U, having secured externally thereto (on the farther side, as U U' is presented in Fig. 2) a double valve chamber, $U^4$. (Shown in Fig. 6 in vertical section through $x\,x$ of Fig. 2.) The construction and operation of this device is substantially identical with that of the regulator C, already described in connection with the tank F and pump P for regulating the supply of steam to the latter.

$U^3$ is a float riding the water of chamber U, and $u^2$ is a shaft oscillated by said float and working the double puppet $U^5$, connecting the chambers $U^2$ and $U^4$. The water from the main W is admitted to the chamber $U^4$ through the pipe $w$. It enters the chamber $U^2$ through passages opened by valve $U^5$, when said valve is raised, and has outlet to the tank F through the pipe $w'$. Of course this mode of automatic water-supply is practicable only when the pressure on the main W is sufficient to feed against that of the tank F.

It is desirable that the temperature of the water of condensation returned to the boilers shall as nearly equal that of the steam when it leaves the boilers as is consistent with the practical working of the main circuit, or, in other words, with the proper return of the water of condensation gathered in the line of the return-main. The difference necessary to this end (represented by the difference of pressure) varies with the contour of the lines, elevation of the transmitters, relative size of the supply and return mains, and other conditions not necessary to here mention. For the purpose of maintaining a practically constant difference in pressure, and therefore of temperature, at the head of the main circuit, between the mains A and B of said circuit, which difference shall be the minimum that will permit the proper return of the water of condensation through the return-main, I provide a pipe, $A^2$, which leads from the supply A in the generator-room to the tank F. Said pipe is provided with a reducing-valve, L, (shown in section in Fig. 7,) automatically controlled by the diaphragm-regulator L', the weight-arm $l'$ of which bears upon the valve-rod $l$. The diaphragm of this regulator is shown to be subject on one side to pressure from the supply A through $A^2$ and $A^3$, and on the other to pressure from the tank F through the pipe $f'$. The desired difference between tank and main pressures, or, in other words, between the pressure of the supply and return mains, is obtained by properly locating the weight $L^2$ on the arm $l'$.

While I have, for greater clearness, shown the connection $A^3$ as leading from the supply A through $A^2$ in the boiler-room, it may, for my purpose, preferably be taken from said supply-main at the outer extremity of the main circuit. This may be accomplished by means of a small pipe laid in the box X from said extreme point of the main circuit to the boiler-room, and here connected, as shown, with the regulator L', said pipe being filled with water.

The tank F is provided with a safety-valve, F', water-gage $f$, and may, in some situations, be prudently provided also with a vacuum-valve. (Not shown.)

The distributing-plant consists, as stated, of the supply-main A, the return-main B, the service-supply A', and the service-return B'. The latter, or service-pipes, extend from the main pipes A and B to the interior of the buildings to be heated, and there they connect with each other through the transmitting, metering, and other apparatus, which will form a separate branch of this description.

The supply and return mains are conducted through the streets at a suitable distance beneath the surface, and are preferably arranged in the novel manner indicated in Figs. 2, 8, and 9, and other figures—that is to say, with the return-pipe above the supply-pipe. They are together incased in the strong box X, of wood or other suitable material, and are separately covered in any suitable manner to insure the retention of their heat. I prefer as a covering for the several pipes, next to the pipe a coating of paper—say one-eighth inch in thickness—outside of this a body of felt or similar material, about one inch, and, finally, a double covering of heavy paper tubing saturated with coal-tar. The box X, if rectangular and made of wood, is laterally stayed at intervals, if necessary, by transverse struts X', passing between the pipes and bearing against the vertical supports $X^2$. The box is accessible at suitable points through man-hole boxes $X^3$, Figs. 2 and 10, having several close-fitting covers, one above the other, inclosing dead-air spaces between them.

The return-main of the duplex distributing system is generally smaller than the supply-main, and in locating said return over the supply, as described, any heat given off from the supply contributes to maintain the temperature of the return by rising to the top of the box. In this arrangement of the mains the pipe A is supported upon transverse rollers $A^4$, resting on the bottom of the box X, or on the intermediate iron plate $I^3$, laid thereon. The pipe B is similarly supported on rollers $B^7$, interposed between the mains. By this means any longitudinal movement of the pipes growing out of expansion and contraction is provided for. For the purpose of keeping the mains in proper relative position, and of affording suitable bearings for the rollers, the mains are seated in saddles I I, and the main A is provided with the upper saddle, I', all preferably having inner projections, $i$, which pass through the outer coverings and bear upon the pipes themselves. Said saddles or plates are also provided with longitudinal V-shaped flanges $i'$, which enter corresponding grooves in the rollers $A^4$ and $B^7$, as clearly seen in Fig. 8.

To still further insure stability in the position of the mains, the saddles I I' of the supply-main A meet and are bolted to each other at the sides of the main, as also shown in Figs. 8 and 9. While providing in the length of the track-plates I and I' for all probably needful movement of the rollers thereon, displacement of the rollers is made impossible by projections $i^2$ at the ends of the plates.

In accordance with obvious necessity, and with the usual practice from time immemorial, in constructing long lines of steam-pipe, both above and beneath ground, I provide for expansion and contraction in the pipe-line by means of slip-joints. I also provide for deflections from the horizontal by means of the familiar ball-and-socket or common flexion joint. Since the flexion and the slip joints will ordinarily be required about equally often in the course of a pipe-line, and since they may preferably be located at the same points in the line, I have, with a view to economy, devised a novel "fitting" or coupling adapted to both the slip and the flexion movements. It is specially illustrated in Figs. 11, 12, and 13 of the drawings, and incidentally shown in other figures. It consists of the casting J, having a packing-bulb, J', at one end, and a ball, $J^6$, at the other. Within the bulb J' is a double-convolute or double-curved wedge-shaped chamber, $J^2$, intended to receive the packing $J^5$. The outer and wider ends of the chamber $J^2$ open to the circumference of the bulb through threaded passages, which admit the packing $J^5$ and receive the thick screws $J^3$. The inner and narrower parts of the chamber open about the central pipe-passage of the fitting. $J^4$ is a short section of pipe, made of suitable non-corrosive material, and smoothly finished on its outer surface. It is fitted to slip freely in the central passage of the casting J, is threaded at its outer extremity, and is packed to make a close slipping joint with the casting J by running in the screws $J^3$ upon the packing $J^5$. At the ball end the fitting is interiorly threaded to connect rigidly with the next section of pipe, in case a flexed joint is not there required. At the left hand, in Fig. 13, the fitting J is shown in connection with a socket applied to the ball $J^6$, thus forming both a slip and flexion joint. $J^8$ is a cast socket-piece, cupped in its broad face to receive the ball $J^6$ and the interposed packing $j'$. The ball is held in place by the divided clamping-plate $J^{10}$, the edges of whose parts meet and interlock, as shown at $j$, Fig. 14. The recess $J^9$, Fig. 13, in the socket-head permits considerable deflection of the joint without contraction of the central passage. At the right, in Fig. 13, the fitting J is provided with lateral wings $J^{11}$ (shown too near the packing-bulb, however) for branch-pipe connections. Said wings consist simply in lateral projections cast on the body of the fitting and tapped to receive the connecting-pipes, the general passage through the casting being, of course, extended into the wings, so as to be reached by the taps.

It is desirable, first, that the duplex-main system, consisting of the supply A and return B, shall be at intervals rigidly connected with each other; second, that provision shall be made at low points in the line for the transfer of the water of condensation from the steam-supply main to the return-main above it; third, that in case of accident to a section of the supply-main in the line the steam may be diverted to the return-main to be used temporarily as a supply or "by-pass;" and, fourth, that under certain circumstances the duplex line may be terminated at a point between its extremities, and a shorter complete main circuit established by the connection of the supply and return mains at such intervening point. For these purposes, and also for the purpose of a branch or service connection, I have devised a novel fitting or coupling, (specially illustrated in Figs. 14, 15, and 16 of the drawings.) This coupling is a double-chambered casting, (designated as a whole by the letter D.) The lower chamber, D', receives at its opposite ends the contiguous sections of the supply-main A, and the upper chamber, $D^2$, similarly receives and connects the contiguous sections of the return-main B. Preferably one end of the coupling has its head $D^{10}$ cupped to seat the balls of the fittings J, already described, for the reason that usually, or often, at the points where the coupling D will be used there will be occasion for either a slip or a flexion joint, or both. The opposite head of the coupling may also be of the same description; but it will usually be tapped, as shown, to receive rigidly the threaded pipes A and B. The lower chamber, D', is shown to be square and the upper one cylindrical. This construction is favorable to the application to the coupling of the drip-transfer device, that will be hereinafter described, and also to the connection of branch or service pipes, as will readily appear.

For the purpose of giving access to the chambers D' $D^2$, and also of utilizing the coupling to make a by-pass, as stated, without the expense of gates or valves, the upper chamber is provided with the large plugged opening $D^3$ and the lower one with the plugged opening $D^4$. By means of these openings the ends of the pipes A and B are accessible and may be stopped off, as shown by dotted lines, Fig. 15. A passage may be opened between the chambers, and other obvious changes made, as occasion may require. The steam-chamber D' is made separately accessible through the hand-hole $D^9$.

The coupling D is held stationary in the line by means of the anchor $D^{11}$, which is a heavy transverse bar of wood or iron, extending on both sides and solidly embedded in the earth or secured to the sides of the incasing-box X.

The service-pipes A' and B' are respectively connected with the coupling D in the manner shown in Figs. 14 and 16, the same relative position being maintained in said services as in the mains described. At the right, in Fig. 16, the service-supply connection A' is shown, as an exceptional case, run down to near the bottom of the chamber D', in order to take water of condensation through the service, if required for a special purpose. To give room for the stop-valves shown in the services, and to afford convenient access thereto, the service-supply A' has an offset, (more clearly seen in No. 14 of the figures so far described.) At whatever other points the coupling D may be placed it will be required usually at the low and high points in the line. To fit the same for use as a drip-transfer at the low points of the main line, the pipes $D^5$, $D^6$, and $D^7$ are made to connect the chambers D' and $D^2$, and are provided with the float-valve $d^2$ and check-valve $d^3$. The valve $d^2$ is operated by the float $D^8$, located in the chamber D', and connected with the valve $d^2$ by the rod $d$, pivoted at $d'$. The excess of pressure in the main A will always, in operation, be sufficient to raise the water of condensation through the pipes $D^5$, $D^6$, and $D^7$ from said main to the return B above it, when the valve $d^2$ is open. The float $D^8$, which controls this valve, is preferably adjusted to never permit the water to rise above the lower inner surface of the main A. For exceptional use, a set-screw, $d^4$, is arranged, as shown in Figs. 14 and 16, to hold the check-valve $d^3$ closed.

To fit the coupling D to discharge air from the return-main B at high points in the line, said coupling is tapped at $D^{12}$, Fig. 15, to receive the float air-valve. (Shown enlarged in vertical section in Fig. 17.) This air-valve has the float $D^{14}$ in the bulb-chamber $D^{13}$, which works the valve $d^6$ in the lateral recess shown, and the check-valve $d^7$, opening upward in the escape-pipe. Remembering that the return-main B is filled with water, the operation of the air-valve is obvious. The large air-chambers, which it is proposed to apply at suitable intervals along the line to the return-main B, may also be connected to this coupling, using the opening $D^3$, preferably, for this purpose. It is, of course, not always necessary to use a flexion-joint in connection with the coupling D; wherefore both ends of said coupling may sometimes be made with both heads tapped to connect rigidly with threaded sections of pipe, as shown at one end in the Figs. 14, 15, and 16 described.

For smaller or branch mains I have specially shown, in Figs. 19, 20, 21, 22, and 23, a novel fitting, consisting of a cast coupling, E, provided with lateral chambered wings E', the latter being tapped on the top to receive the service-pipe. This coupling, intended for use more commonly on the service or branch pipes, is shown provided with a novel device, whereby connection therewith may be readily made while it is under pressure. This device, which will form the subject for a separate application for patent, consists in a plug or bush, $E^2$, having a threaded aperture of proper size to admit the proposed connecting-pipe. Said bush $E^2$ bears against the annular shoulder $e$, narrower than the thickness of the bush. Between the bush $E^2$ and shoulder $e$ is interposed a disk of rubber packing, $e'$, having the metal disk $e^2$, which is larger than the aperture of the bush $E^2$, and bears upward against the said bush, making, by means of the intervening packing, $e'$, a close joint therewith when the line is under pressure. The tap or nipple $E^3$, by which connection is to be made with the coupling E, is beveled outwardly at its lower end, as shown at $e^3$ in Fig. 23. When the connection is to be made, this nipple $E^3$ is run down against the packing $e'$, and is worked backward and forward and gradually inward until the packing is cut through by the nipple-edge $e^3$, whereupon the piece cut out, having the disk $e^2$ attached thereto, falls to the bottom of the chamber, as shown in Fig. 23, leaving the connection complete. By means of this device the lines of pipes may be prepared, when laid, to receive connections at all desired points and at any time without taking off the pressure therefrom. Obviously, if deemed necessary, the device set forth may also be applied to the main coupling D, already described.

In running long lines of incased service-pipes, provision may sometimes be more economically made for expansion and contraction of said pipes by the construction shown in Figs. 24, 25, and 26, which will be recognized by those acquainted with the art as very ancient and familiar devices. In Fig. 24 the space between the short sections of pipe at right angles with the line is sufficient to permit the direct lines to approach without striking in any possible elongation thereof by expansion, and the length of the said short sections is sufficient to allow the same to spring in the elongation of the direct line without opening the joints. As to the box X in these figures, it is simply made large enough at the angles of the pipe to give room for the movement of the pipes in the act of expanding or contracting.

On the smaller branches and service-lines the separation and relative position of the two pipes, supply and return, need not require the use of the rollers shown in Figs. 8 and 9; but the saddles, preferably interposed at intervals, and having broad and flat faces, may meet and slip one upon the other.

Having now described the general details of construction in the underground street-mains, branches, services, and their connections with each other, I next point out preferred methods for their arrangement and direction in the streets and passages where laid.

It is of the first importance that there shall be as few points of connection as may be, for many reasons besides economy in construction of plant. I have therefore contrived an arrangement by which a single central connection, and man-hole giving access thereto, may be made to serve in many instances for four entire squares of business-buildings. This arrangement is shown in general plan in Fig. 27. It consists in locating a coupling, D, at the intersections of alternate streets, taking four pairs of supply and return services therefrom, and running one pair of them entirely around each square beneath the sidewalks. From this general or main service pipe of each square the individual services are taken off to the interior apparatus of the several buildings on the square. Fig. 28 is an enlarged view of the connection in the street-intersection, showing the duplex services carried along parallel (and in the same box X) with the mains A and B, to points opposite the sidewalks, whence they deflect at right angles with the mains and enter the space beneath the walks. In business-blocks this space is almost invariably excavated, and forms an outer extension of the cellar or basement space of the buildings, affording ample and available space for the location of the pipes and ready and convenient access to the connections of the individual services leading therefrom. In Fig. 29 a corner portion of the walk or flagging is removed, showing in plan the general direction and position of this general service, with an individual service leading from it in view. In these several Figs. 27, 28, and 29, M represents the duplex main lines, constituted of the supply-main A and return-main B; M', the duplex branch lines, formed of the general service-supply A' and corresponding return B'; and $m$, the individual duplex service, formed of the supply and return pipes A' and B', leading from M' to the interior of an individual building. The large couplings D D are shown in the street at the right in Fig. 27 as adapted for intersecting mains, or as four-way couplings.

The four squares at the left, in Fig. 27, are intended to represent residence-blocks, in which the general duplex service branch line M' runs from one main line to the next parallel line through the alleys of the intervening squares, and the individual service-lines $m$ are shown in dotted lines as entering the several buildings at the rear.

Coming, now, to the third branch of this description, I proceed to give a detailed explanation of the transmitting, metering, and other apparatus in the main circuit, at and near the point of its junction with the distributing apparatus of the individual buildings, to which some reference will also, of necessity, be here made.

In Figs. 30, 31, and 32 I have shown a compact unitary construction of apparatus, embracing an anhydrator, a transmitter, and a meter, through which the service-pipes A' and B' connect with each other, completing a branch of the main circuit. In this arrangement of the apparatus mentioned, K is a rectangular cast-iron box, which forms a base for the remaining parts. The supply-service A' communicates with the top of the chamber or tank-trap K through an anhydrator, K'. On entering the chamber K the separated water falls to the bottom, and the dry steam passes upward from the top of the chamber through $A^5$ to the transmitter. The transmitter here shown consists of a closed vertical metal cylinder, T, supported from the box R by the frame $T^2$, and interiorly divided by parallel diaphragms $t\ t$. The upper and lower chambers of the transmitter, cut off by these diaphragms, are connected with each other by the numerous tubes $t'\ t'$, like those of a tubular boiler. The steam-supply $A^5$ enters the upper chamber of the cylinder T, and the return $B^8$ leads from the lower chamber thereof, carrying the water of condensation to the meter N. The meter discharges by the pipe $B^9$ into the chamber K, whence the water is forced out through the pipe $B^{10}$, having the float-valve $k^2$, into the service-return B'.

The anhydrator K' consists of a cylindric shell inclosing a fixed worm, $k'$, which gives the steam a spiral direction. In accordance with the well-known principle of this appliance, the water of hydrous steam, having greater specific gravity than the steam itself, is separated by centrifugal action from the latter, and on entering the chamber K falls to the bottom. Only dry steam, therefore, enters the transmitter through the pipe $A^5$.

The central chamber, T', of the transmitter T, bounded by the diaphragms $t\ t$ and penetrated by the tubes $t'$, is in direct communication with the local circuit, as distinctly shown in Figs. 31 and 32, wherein $a$ is the supply and $b$ the return of the local or interior distributing system of the building.

In the operation of the apparatus the heat of vaporization, due to a given pressure of the steam supplied through the pipe $A'\ A^5$, as described, is transmitted to the fluid contained in the local circuit $a\ b$, through the walls of the tubes $t'$ and the diaphragms $t$. In parting with its heat of vaporization the steam supplied is, of course, condensed. As a consequence the top of the transmitter is occupied by steam and the lower portion by the water of condensation. It is proposed that the water-line shall usually be above the bottom of the tubes $t'\ t'$. The heat imparted in the transmitter from the contents of the main circuit to the contents of the local circuit or system is not only the heat of vaporization in the steam, but is also the heat, or a portion of the heat, of the condense-water. For, as is well known, the temperature of the condense-water at the instant of condensation is equal to that of the steam from which it is condensed; but the water quickly gives off its heat to a contiguous body of lower temperature, so that it is only at the surface of the water that the high temperature mentioned prevails. For the purposes of this description a plane located a short distance below the water-surface may therefore be imagined to exist, above which plane heat is transmitted from the main to the local circuit or system, and below which heat is not transmitted. It is clear that if this plane, or the parallel water-surface, be raised and lowered in the tubes $t'$, the area of heat-transmitting tube surface will be varied, and the amount of heat transmitted will be correspondingly varied.

For the purpose of automatically raising and lowering the water-level in the tubes $t'$, and thereby automatically regulating the amount of heat transmitted from the main to the local circuit or system, and for the further purpose of effecting this regulation with reference to the varying expenditure of heat throughout the local circuit, an ordinary pressure diaphragm regulator, G, may be employed, as follows: The upper face of the diaphragm $g^4$, Fig. 35, is subjected to pressure from the chamber T' of the local circuit through the pipe $g$. In the pipe $B^8$ is located a valve, G', whose stem $g'$ connects directly, or through the medium of the weight-arm $g^2$, with the diaphragm-pin $g^3$, so that pressure from the local circuit on said diaphragm $g^4$ tends to close the valve. The weight $G^2$, on the other hand, operates, through the arm $g^2$, to oppose the pressure of the diaphragm and to open the valve G', said arm $g^2$ being, for this purpose, appropriately connected with the valve-stem $g'$ and diaphragm-pin $g^3$. The pressure on the local circuit being, of course, proportionate with the heat of said circuit, when the latter is less than the degree at which the regulator is set the valve G' will be opened, and vice versa. The degree of heat required in the local circuit may be varied at will by shifting the position of the weight $G^2$ on the arm $g^2$.

Coming, now, to the meter, it may be stated that, for the general purpose of my invention, any reliable fluid-meter may be employed. I have, however, devised a special form of meter, which I prefer in connection with this system. As said meter forms the subject of separate application for patent, it will be here only briefly described in relation to parts connected therewith, as shown in the drawings, as follows:

N is a cast-iron case fastened to the top plate of the tank-trap K. The discharge-pipe $B^8$, leading from the transmitter, enters the meter-case at the top. The meter is divided into two chambers, which are successively supplied by appropriate inner and automatic mechanism, and which successively discharge, by valves operated by the same inner mechanism, through the branched pipe $B^9$, located within the chamber K, and reaching to near the bottom thereof, as seen in Fig. 31.

It has been stated above, in connection with the description of the transmitter, that heat is taken from the hot water as well as from the steam within said transmitter. As so far described, the meter, measuring only the condense-water of the transmitter, would not record the heat taken from said condense-water, but only that taken from the steam. This would obviously be inaccurate and insufficient. Moreover, in parting with heat said condense-water is reduced in volume somewhat, which fact would increase the inaccuracy of the measurement. To correct this inaccuracy steam is admitted from the supply of the main circuit to the meter, or to the condense-water pipe leading thereto near the meter, for the purpose of restoring to the condense-water about to be measured the temperature lost subsequent to condensation. The restoration of this temperature by the means stated of course involves the condensation of the steam by which the restoration is effected, and the measurement of the water so condensed, together with that originally condensed, is the true measurement from which to register the heat given off by both the steam and hot water in the transmitter. Thus raising the temperature also restores the original volume of the condense-water from the transmitter, and therefore makes the measurement perfect. The heat transmitted to the local circuit equals, therefore, the heat of vaporization of the water passed through the meter. Provision for thus admitting steam from the supply of the main circuit to the meter is shown at $n^{17}$, Fig. 34, consisting in a pipe leading from the supply-pipe $A^5$ to the top of the meter. It may consist of a passage provided in the meter itself and leading upward from the tank-trap K to the top of the meter, when these parts are arranged as shown in Figs. 31 and 32. Another office of this connection or steam-passage is to equalize the pressure between the meter and the tank-trap K, whereby the meter is enabled to discharge freely into said trap. Between the transmitter and the meter a return-bend trap, $n^{18}$, of suitable head, is inserted in the pipe $B^8$, to prevent the passage of steam under all circumstances. The presence of this trap necessitates the application of an air-valve to the lower chamber of the transmitter, which valve should discharge into the meter. Said air-valve is not shown.

The meter should preferably be contrived to register in dollars and cents.

For an exceptional use of the return-main and return branch or service pipes as supply-pipes, which will be hereinafter described, the connection $B^{11}$, provided with the stop-valve $B^{12}$, unites the return B' and supply A' near the transmitting and metering apparatus, as seen in Fig. 31.

Other parts, shown in Figs. 30, 31, and 32, and not so far described, will be explained in connection with later remarks upon the exceptional or alternative use of the return mains and branches as steam-supply pipes.

I next proceed to describe some forms of local-circuit construction adapted to be used in connection with the main circuit described.

I first remark that the local circulation may be either steam or hot water, as desired. In either case, $a$ will represent the outlet from the transmitter T, conveying the steam or water to the several heating appliances in the circuit, and $b$ will be the return, leading from such appliances back to the transmitter, and returning water thereto to be reheated or revaporized, as the case may be.

Referring, again, to Fig. 31, when steam is made the medium of heat-distribution, the chamber T' of the transmitter T is filled to a proper height, indicated by the gage $t^2$, which connects with said chamber. If a water-supply having sufficient pressure is available, an automatic feed may be applied to the circuit, as also shown in Fig. 31. $T^3$ shows a small tank for this purpose, communicating by the pipes $t^3$ with the chamber T' of the local circuit above and below its proper water-line. The pipe $w^2$ discharges into the tank $T^3$ from the source of water-supply under the control of a float-valve within said tank. The water-line in the tank T' being the same as that in the chamber $T^3$, the quantity of water in the latter will be maintained substantially on this line. In the absence of connection with a water-source of sufficient head, the local circuit will be supplied from time to time by means of a suitable pump.

To avoid multiplicity of drawings, I have, in Fig. 36, shown two local circuits in one building—one in the rear part of the building, for steam, and the other heating the front part by hot water. At the right, near the entrance of the service-pipes A' and B', are shown the transmitting and metering appliances. (Separately illustrated in Figs. 30, 31, and 32.) The steam local circuit embraces the supply and return pipes $a$ and $b$, the water-heater $R^2$, (also connected with the stove,) a cooking apparatus, R', and a radiator, R, which several appliances may, together, stand for the general working apparatus of an entire building.

The only novel feature requiring additional description here is the water-heater $R^2$, which, for the purpose of connection with the closed circuit $a$ $b$, is provided with an outer jacket or shell, between which and the inner water-vessel is the chamber $r$, connected in said local circuit. The inner or water chamber is shown connected with the water-back of the stove or range in the usual manner. The hot-water circuit in the front or main portion of the building has a separate transmitter, T, (shown at the left of that already mentioned,) connected with the main circuit through the horizontal extensions of $A^5$ and $B^6$. (Clearly shown.) The vertical supply $a$ of this limited local circuit leads up from the top of the chamber T' of the transmitter. Horizontal pipes run therefrom to the several radiators or other appliances to be heated, and the general return $b$ leads back from said appliances to the bottom of the chamber T' of the transmitter.

Above the highest radiator in the building, and connected with the supply $a$, is an expansion-tank, $W^4$, provided with a gage, $w^3$. The circuit is filled from the water-supply W (here shown as a tank in the rear attic) through the water-feed, $w^2$. From the expansion-tank $W^4$ rises the pipe $w^4$, open at the top, and having a cock $w^5$. The circuit is filled to show a water-line above the bottom of the expansion-tank $W^4$ by the gage $w^3$. The transmitter T of the circuit has a diaphragm pressure-regulator, G, of the character, and connected, as already described of Fig. 35. When the cock $w^5$ is open, the regulator G is subject to pressure due to the head of water in the pipe $a$ and its vertical extension. This head will vary with the temperature of the water in the circuit, and the weight $G^2$ is set on the regulator-arm to balance the head when said water is of the temperature required to heat the building. Two weights may preferably be used—one to balance the natural head, or that of the water in the circuit when cold, and the other to be variably set to balance the increase of head due to raised temperature from time to time required in the circuit. If a temperature is required in this hot-water circuit materially greater than that due to atmospheric pressure, it will only be necessary to close the valve $w^5$, when the specific office of the expansion-tank $W^4$ will appear. Said tank being of proper dimensions and inclosing a body of air above the water-line, the compression of said air-body will permit any expansion of the water and increase of pressure in the circuit within the limits of strength in the pipes. The pressure upon the diaphragm-regulator G when the valve $w^5$ is closed is steam-pressure and not hydraulic.

In thus illustrating the conjoined use of steam and hot-water circuits in one building, it is apparent that both need not be so used, but that the entire working apparatus of a building may be either for steam or water, as required.

When special reasons exist for so doing, steam may be taken from the main circuit, run through a local circuit and back, as water through a meter, for measurement into the main circuit.

In Fig. 34 I have shown an arrangement for two limited local circuits—one a closed circuit from the transmitter T, as already set forth, and the other circulating steam from, and therefore being in fact in, the main circuit. The latter has the tank $F^3$ connected with the supply $a'$ and return $b'$ of this limited circuit on the equalized-pressure principle set forth in Letters Patent of the United States numbered 212,320, granted to me February 18, 1879, $a^2$ being the equalizing-pipe of that patent. There are, however, serious objections to the direct circulation of steam from the main through the local circuit. Among these may be mentioned, first, the necessity of using the steam at the pressure on the mains, or of reducing the pressure by a reducing-valve, the use of which occasions an almost intolerable noise; second, liability of loss to the supplier by the abstraction of steam or of water of condensation in the course of the local circuit; third, in the use of reduced pressure in the local circuit, it would be impracticable, except by a pump or its equivalent, to return the water of condensation to the main return-pipe. This would compel, fourth, the discharge of the local circuit without such return, which, in itself, entails numerous objectionable results, besides the very serious one of losing the pure water of the circuit and supplying its place from the general source of supply.

In Fig. 37 I have shown a business-block having an engine in the basement, and, as a novel and desirable provision for such building, an individual circuit and meter for a suite of three connected rooms.

When an engine is to be run requiring a higher pressure of steam than would be needed for heating purposes alone, the steam may be raised in the transmitter to nearly the pressure on the main circuit, the steam taken from the transmitter to the engine, the exhaust from the engine sent to radiators for heating the whole or a part of the building, and the condensation therefrom returned to the transmitter, to be reconverted into steam by a pump run by the engine. This arrangement is shown in Fig. 37, wherein O represents an engine, $P^2$ a pump run thereby, and $F^4$ the tank of a limited local circuit heated from the engine-exhaust.

If only a part of the building is heated, or if the building is only partly heated throughout from the engine-exhaust, additional heating apparatus may take its supply directly from the transmitter. In this case the radiators of such supplemental circuit would be smaller than otherwise, having a radiating surface in inverse ratio to the higher pressure in such circuit. When the engine is not running, the exhaust system or circuit can be connected with that just mentioned as leading from the transmitter by simply cutting out the engine by suitable valves.

In connection with a small class of engines likely to be much used in conjunction with a general steam-heat supply, such as is herein contemplated, an engineer and expensive automatic contrivances will not usually be afforded. I therefore provide a device which may be called "a combined trap and relief." (Seen in Fig. 37, but better illustrated in the enlarged detached Fig. No. 38.) It consists, essentially, of a tube, H, of any desired height, let into the ground, when practicable, and connected, directly or indirectly, with the tank $F^4$ at the level of the proposed highest water-line in said tank. Said tube is provided with a discharge-pipe, $h$, not higher than the high-water line of the tank $F^4$, which pipe may lead to the sewer or elsewhere, and which takes from the tube H at a depth from its outlet fixed according to the maximum pressure required in the tank $F^4$. The connection with the tank being at the highest water-level in said tank, when the water is at a lower level the relief will not be called into play, except by a steam-pressure equal to, or in excess of, the hydraulic head represented by the vertical height of the discharge-pipe $h$ within the tube H. In the use of this relief device the tank and connections cannot fill with water should the pump become deranged, nor can the engine fill and suffer injury thereby. When the exhaust-circuit mentioned is connected in the general local circuit, the relief device described should be cut off therefrom.

For the limited office-circuit, (shown in Fig. 37 as having an individual meter,) the supply and return pipes $a$ and $b$ are carried up from the transmitter T in the basement. The leaders from these pipes are, in practice, preferably taken off above the floor of the rooms to be heated; but for the purpose of greater clearness of illustration they are herein shown as being taken off beneath said floor. For the same reason some of the parts are exaggerated in relative size.

$F^5$ is a small tank receiving the water of condensation and discharging by overflow through the meter N back into the vertical return $b$. The tank $F^5$ connects also with the supply-pipe $a$, leading to the radiators, for the purpose of equalizing the pressure to insure discharge and work the meter. The immediate supply-connections $a^3$ to the radiators $R^4$ serve as returns for the water of condensation from the radiators.

The pipes $r'$, leading from the top of the radiators, are air-pipes connecting with the return $b$. These air-pipes are connected with the supply-connections $a^3$ by the pipes $r^2$, and at the junction of said pipes $r^2$ with the pipe leading to the returns $b$ are located three-way valves $r^3$. The supply-connections $a^3$ are, as usual, provided with the valves $r^4$. In the return $b$, leading from the radiators, and near its point of discharge into the tank $F^5$, is located an air-bulb, $R^3$, having an automatic air-valve, $r^5$, connected therewith, which serves for all the radiators on the line. The air is found in practice to discharge perfectly from the radiators by the arrangement described. In case the radiator-connections $a^3$ and $r'$ are long and the radiator is cut off, a circulation may be maintained through the said pipes up to and through the pipe $r^2$, connecting them, to avoid freezing of the valves, the three-way $r^3$ being properly turned for this purpose. The general circulation of this limited circuit, just described, will be recognized as embracing the distinctive features described in my aforesaid Letters Patent, numbered 212,320.

The duplex system of mains forming the main circuit described has many advantages of economy, both in construction and operation, and will ordinarily be used in the manner set forth—that is, as a sealed or closed circuit. In the summer season, however, when consumption of heat on the lines is light, it may be temporarily advantageous to not run the main circuit, as described, but to supply through the return-main B instead. The reason of this is, that the summer season is the appropriate time for general repairs, extensions, alterations, &c., and by using the return as a supply such changes may then be made without cutting off consumers, whose patronage will, of course, largely depend on the certainty of their supply. In order to provide for this alternative use of the return B, either throughout its whole length in the summer, or by and beyond a break in the supply A at any season, the connecting-pipe B[11], Fig. 31, is introduced and provided with the stop-valve B[12]. The pipe B[10], leading from the chamber K, in that case discharges through B[13] into the sewer or elsewhere, instead of into the return B'. To provide for this alternative use of the return-pipes, the pipe A[10], Fig. 2, leading from A to B in the boiler-room, is provided, and suitable stop-valves, 1, 2, and 3, are inserted in the pipes A, B, and A[10], respectively, as shown in said Fig. 2.

Valves may be inserted in the mains at any points where required; but, by reason of the construction of the chambered couplings D, described at length, the number of such valves need not be great.

Air or steam chambers for the usual purpose may be located on the main return B, the latter or steam-chambers, if employed, being supplied from the main A by any suitable automatic device. Their presence is less essential, however, since the circuit is otherwise planned to secure steady and constant motion in one direction. In the use of the main circuit as a circuit the return B will normally be constantly full of water and the supply A of steam.

I conclude by calling attention to the fact that in the transmitter T the inlet and outlet of the several circuits are arranged in accordance with the natural course of the two circulations. Thus in the tubes $t'$, which are part of the main circuit, the course of the fluid is downward, or in the natural direction of such fluid as it cools. In the local circuit the direction of movement is upward, which is its natural course as the fluid is heated.

It may also be properly explained that, instead of making the coupling D stationary when used in the main line by means of an anchor, as described, the entire length of main may be free to move under expansion and contraction. In providing for such movement the slip-joint should be employed at each side of the coupling, and to prevent too great movement at a single point, and the drawing out of any one of the slip-sections J[4], each of said sections should be provided with a lug or eye, and a short chain or link should connect said eye with a similar eye on the casting J. The movement of each joint will be thus restricted within a safe and proper limit.

It should, perhaps, be more particularly stated that the mains A and B should be directly connected with each other at their outer extremities. This will usually be done through the coupling D, through the float-valve and connecting-passage of pipe D[5] D[6] D[7], or otherwise, by means of a suitable trap-connection operating to the same effect.

Separate application will be made for patent for the method, broadly, of measuring heat of steam by metering the water of condensation.

I also reserve the right to make separate application for patent on the method and apparatus described for transmitting heat from the steam of a main pipe or circuit to the contents of a local distribution pipe or circuit.

Having thus described my invention, I claim—

1. The combination, with a main or general steam-supply pipe, a local distributing-pipe having no interior connection with said supply-pipe, and apparatus for transmitting heat from the contents of the former to the contents of the latter, operating to condense the steam of the supply in the act of transmission, of mechanism whereby the amount of heat transmitted may be varied at will, and a meter arranged to pass the water so condensed, substantially as described.

2. In a general steam-heating system, the combination, with a street or main supply-pipe connected with the steam-space of a generator, of a local distributing-pipe situated in a building to be heated, the contents or circulation of said local distributing-pipe being separate from that of the main supply-pipe, apparatus for transmitting heat from the contents of the main to the contents of the local pipe, operating to condense the supply-steam in the act of transmission, and a meter arranged to pass the water of condensation from the supply-steam, substantially as described.

3. In a general steam-heating system, a main circuit comprising a steam-generator, a steam-supply pipe or pipes, a pipe or pipes for the return of water of condensation, and apparatus for forcing the water of condensation from the return-pipe back to the generator, the pipes of said main circuit extending, in proximity with each other, from the steam-source to the building or buildings to be heated, and combined with local heating apparatus, either for steam or hot water, located in said building or buildings, substantially as and for the purposes set forth.

4. In a steam-heating system for large districts, the combination, with the main circuit containing a steam-generator, a steam-supply pipe, and a condense-water-return pipe, operated substantially as described, said pipes being arranged in proximity throughout the heated district and connected at the several buildings heated, of a local circuit situated in a building to be heated and adapted to be closed, so as to continually circulate its contents, means for transmitting heat from the main circuit to the local circuit, and means for measuring the amount of heat transmitted, substantially as described.

5. The combination, with a steam-generator, a steam-supply pipe, and a condense-water-return pipe belonging to a steam-heating main circuit, said pipes being arranged in proximity throughout the heated district, and with a local heating apparatus having a circulation distinct from that of the main circuit, of a transmitter placed at the junction of the main circuit, with the local heating apparatus, connected to receive and operating to condense the steam from the supply-main, and also connected to discharge the condense-water into the return-main, and a meter arranged to pass the condense-water after it has left the transmitter and before it enters the return-main, substantially as described.

6. The combination, with a steam-supply pipe, a local heating apparatus operating to condense the steam supplied, and a meter arranged to pass the condense-water, of a pipe or passage, $n^{17}$, conducting steam from said supply-pipe to the meter or to the condense-water pipe leading to the meter, for the purpose of restoring to the condense-water the temperature and volume lost subsequent to condensation in its passage through the heating apparatus, and thereby securing accurate measurement of the heat supplied, substantially as described.

7. In the measurement of heat supplied from steam to a heating apparatus by metering the water of condensation, the method herein described, which consists in practically restoring the condense-water, after it leaves the heating apparatus and before it passes the meter, to its original temperature and volume at the instant of condensation, substantially as and for the purposes set forth.

8. In combination with the generator S and the duplex system of mains A and B, the tank F and the pump P, connected between the return-main B and the generator, substantially as and for the purposes set forth.

9. In combination with the generator S, the pump P, and the tank F, the latter directly furnishing water for the generator through said pump, mechanism adapted to automatically control the speed of the pump in accordance with the quantity of water in said tank, substantially as set forth.

10. The combination, with the generator S, tank F, and pump P, of the steam-pump supply-pipe S' S², having the valve-chamber C and valve C², the latter being worked by the float F² within the tank F, substantially as and for the purpose set forth.

11. In combination with the generator S, the tank F, the source of the water-supply W, having a pressure greater than that of the tank F, and automatic mechanism controlling the passage of water from the tank to the generator, mechanism whereby the passage of water from the source W to the tank is controlled by the height of the water in the generator, substantially as set forth.

12. The combination, with the tank F, generator S, pump P, and automatic mechanism for regulating the speed of the pump, of the water-source W, connected with the tank through the pipe W' w w', and the float-valve U⁵ in the said connecting-pipe, said valve being controlled by the float U³ in the chamber U, connected with the generator in such manner as to have a common water-line therewith, substantially as and for the purpose set forth.

13. In combination with the steam-supply main A and the return-main B of the main circuit, embracing the tank F and the generator S, and mechanism for forcing the water of condensation from the tank to the generator, the connecting-pipe A², having the reducing-valve L, controlled through suitable mechanism by pressure from the supply-main, to maintain a desired difference in pressure between the tank and the supply A at the head of the main circuit, substantially as and for the purposes set forth.

14. The combination, with the tank F and the supply A of the main circuit described, of the pipe A², having the valve L, the diaphragm-regulator L', of which the weight-arm l' is arranged to bear on the valve-rod l, and in which the diaphragm is exposed on one side to the pressure of the tank and on the other to that of the supply-main A, at a chosen point on said main, substantially as and for the purposes set forth.

15. In the main circuit of a general steam-heating system, the supply-main A and the return-main B, arranged one above the other in the box X, as shown, and for the purpose specified.

16. In combination with the mains A and B, arranged, as described, one above the other, the rollers A⁴ and B⁷ and the saddles I and I', constructed and combined to retain the mains in proper relation, and at the same time permit relative longitudinal movement, substantially as described.

17. In combination with the thick covering of the main pipe and the supporting-roller, the interposed saddle I, having the projections i, which pass through the pipe-covering and bear upon the pipe itself, substantially as described.

18. In combination with the mains A and B, arranged one above the other, as shown, the saddles I and I' of the lower pipe, extended about the pipe to afford mutual support to each other, substantially as described.

19. The slip-joint fitting J, having the packing-bulb J', provided with a curved chamber, J², narrowed toward the central pipe-passage, and with the packing-screw J³, substantially as described.

20. The combined slip and flexion joint fitting J, having the packing-bulb J', chambered, as shown, at one end, and the spherical bulb J⁶ at the other end, whereby the fitting is adapted to be combined with a suitable socket to make a flexion-joint, substantially as set forth.

21. In combination with the duplex-main system described, the coupling D, having the chambers D' and D², and adapted to receive the mains A and B, one above the other, substantially as shown and described.

22. The double-chambered coupling D, combined with the mains A and B, and adapted to afford communication between these mains by the plugged opening D⁴, substantially as described and shown.

23. The double-chambered coupling D, adapted to be connected flexibly with the mains A and B at one or both ends, combined with said mains, as set forth.

24. In combination with the steam-supply main A and water-return main B, the double-chambered coupling D, having its chambers connected by a pipe or passage, $D^5$ $D^6$ $D^7$, provided with a valve controlled by a float in the steam-chamber of the coupling, whereby the coupling may serve as a drip-transfer, automatically discharging the water of condensation from the main A into the return B, substantially as described.

25. In combination with the double-chambered coupling D, rigidly connecting the mains A and B, the anchor-bar $D^{11}$, substantially as shown, and for the purpose specified.

26. The double-chambered coupling D, provided with the hand-hole $D^9$, opening into the lower chamber, D', combined with the mains A and B, substantially as described.

27. The duplex main-pipe system described, consisting of the supply-main A and the return-main B, arranged parallel with each other and in proximity, said pipes being rigidly connected with each other at intervals, and provided with slip-joints between the points of connection, substantially as described.

28. In a system of general steam-heat supply, the combination, with the supply-main, of a supply-branch leading from said main and extending around an entire square or block of buildings, whereby all the buildings in said square or block are supplied from a single connection with the main, said branch being arranged beneath the walk or buildings, so that the connections with the interior heating apparatus of the several buildings are accessible without opening the street, substantially as described.

29. In combination with the supply-main of a general steam-heating system, two or more supply-branches connected with said main at the intersection of streets, and each leading to and around an adjacent square, to serve as a general branch supply, furnishing heat to all the buildings in the square heated from said system, said branches being arranged beneath the walk or buildings, substantially as described.

30. In combination with the general supply-main, having provision made at the intersection of streets for the connection of branches thereto, one or more branches connected with said main at said intersection, extending parallel with the main until opposite the square, and thence leading to and about the square beneath the walk or buildings, substantially as shown, and for the purposes stated.

31. In a general steam-heating system, the apparatus, Fig. 31, comprising the tank-trap K, transmitter T, meter N, and connections for the admission and passage of steam into the transmitter through the tank-trap and the water of condensation from the transmitter through the meter and tank-trap, said transmitter being adapted to be connected with a local distribution system, substantially as described.

32. The anhydrator K', combined with the supply-pipe A', transmitter T, and meter N, substantially as and for the purposes set forth.

33. In combination with the tank-trap K, connected to receive the pressure of the steam-supply pipe A', and also connected to receive the water of condensation from the transmitter T or the meter N, the discharge $B^{10}$, having the valve $k^2$, operated by a float and located beneath the water-line of said tank, substantially as described.

34. In combination with the transmitter T, having the passage $t'$ in the main circuit through or contiguous to the chamber T' in the local circuit, the valve G' in the discharge-pipe $B^8$ of the main circuit, governed by the pressure in the chamber T', so as to raise or lower the water of condensation in the passage $t'$, and thereby expose more or less of the surface of said passage to the steam of the main circuit, substantially as described, and for the purpose specified.

35. In combination with the local hot-water circuit, Fig. 36, having a pipe extending a suitable distance above the highest radiator in the circuit, said pipe being either open at the top or provided with a valve whereby it may be opened or closed, the transmitter T, connected with said circuit, and also with the steam supply and return pipes, as described, and the regulator G, connecting, as indicated, with the transmitter and with the return steam-pipe, whereby varying pressure in the local hot-water circuit, arising either from the varying column due to change of temperature therein or from the confinement of its contents, operates to control the heating effect of the transmitter, substantially as described.

36. In combination with the meter N, receiving the discharge from the transmitter T and discharging into the tank K, the latter being subject to the pressure of the steam-supply, the pipe or passage $n^{17}$, connecting the top of said meter with pipe $A^5$, or other pipe or space having the pressure of the steam-supply, substantially as described, and for the purpose stated.

37. In combination with the meter N, connected at its top to receive steam from the steam-supply pipe, as shown, the trap-bend $n^{18}$ in the pipe $B^8$, discharging into the meter, substantially as described.

38. In combination with the main steam-supply, or with the main circuit described, the local hot-water circuit, Fig. 36, combined with the compression-tank $W^4$, open pipe $w^4$, and cock $w^5$, substantially as shown and described.

39. In combination with a general steam-source and a transmitter connected therewith, an engine having its steam-supply connected with the transmitter, a local heating-circuit supplied from the exhaust of the engine, and a pump run by the engine, connected to force the water of condensation from the exhaust heating-circuit mentioned back into the transmitter, substantially as shown and described.

40. In combination with the transmitter T, connected with the main circuit or steam-supply, Fig. 37, and with the engine O, pump $P^2$, and tank $T^4$, respectively connected as shown, the safety relief-trap H, connected with the tank $F^4$, and provided with a discharge-pipe, $h$, arranged in the said trap, as set forth, and for the purpose stated.

41. In combination with the radiators $R^4$ $R^4$, Fig. 37, and the supply-pipe $a$ and return-pipe $b$, the connecting-pipes $a^3$ and $r'$, arranged as shown, and the air-valve $r^5$ on the return $b$, substantially as and for the purpose set forth.

In testimony that I claim the foregoing as my invention I affix my signature in presence of two witnesses.

EUGENE F. OSBORNE.

Witnesses:
M. E. DAYTON,
JESSE COX, Jr.